United States Patent
LeBreton

(10) Patent No.: US 7,090,736 B2
(45) Date of Patent: Aug. 15, 2006

(54) PRESSURE VESSEL PRESTRESSING TECHNIQUE

(75) Inventor: Edward T. LeBreton, Mentor, OH (US)

(73) Assignee: ESSEF Corporation, Chardon, OH (US)

( * ) Notice: Subject to any disclaimer, the term of this patent is extended or adjusted under 35 U.S.C. 154(b) by 182 days.

(21) Appl. No.: 10/370,376

(22) Filed: Feb. 20, 2003

(65) Prior Publication Data

US 2004/0163755 A1   Aug. 26, 2004

(51) Int. Cl.
*B65H 81/00* (2006.01)

(52) U.S. Cl. ............ 156/156; 156/169; 156/172; 156/173; 156/175

(58) Field of Classification Search ............... 156/156, 156/172, 173, 169, 175
See application file for complete search history.

(56) References Cited

U.S. PATENT DOCUMENTS

| | | | | |
|---|---|---|---|---|
| 3,545,262 A | * | 12/1970 | Steele et al. ............... | 73/37 |
| 4,085,860 A | * | 4/1978 | Hawkins et al. ............ | 220/89.4 |
| 4,514,447 A | * | 4/1985 | Boxmeyer .................. | 428/36.3 |
| 5,577,630 A | * | 11/1996 | Blair et al. .................. | 220/581 |
| 5,762,091 A | * | 6/1998 | Sarne et al. .................. | 137/74 |
| 6,412,484 B1 | * | 7/2002 | Izuchukwu et al. ..... | 128/205.22 |
| 6,716,503 B1 | * | 4/2004 | Hauber ....................... | 428/36.3 |

FOREIGN PATENT DOCUMENTS

DE          4215756 A1 * 11/1993

OTHER PUBLICATIONS

Translation of German Patent 4215756, 5 pages.*

* cited by examiner

*Primary Examiner*—Jeff H. Aftergut
(74) *Attorney, Agent, or Firm*—Pearne & Gordon LLP

(57) ABSTRACT

A method of making a filament wound pressure vessel. A thermoplastic liner is filament wound with a commingled roving containing thermoplastic and reinforcing filaments. The wound tank is partially filled with a cooling liquid and the wound tank is heated to a temperature which is sufficient to vaporize a portion of the liquid to pressurize the liner at a preselected set pressure and sufficient to fuse the thermoplastic matrix, but insufficient to significantly soften the liner.

5 Claims, 2 Drawing Sheets

PRESSURE VESSEL PRESTRESSING TECHNIQUE

BACKGROUND OF THE INVENTION

This invention relates to a method of manufacturing hollow, reinforced plastic composite articles, and, more particularly, to a method of prestressing a filament wound pressure vessel having a thermoplastic matrix.

Composite pressure vessels have typically been fabricated by a filament winding process which utilizes thermoset plastic resins such as epoxies, polyesters and vinylesters. A thermoplastic liner serves as a winding mandrel and the liner is mounted in a filament winding machine. Reinforcing filaments, usually glass, are trained through a liquid thermosetting resin bath and are wound in a helical pattern on the liner. The composite is cured at ambient temperatures or with heat and the liner becomes an integral part of the finished vessel.

Thermosetting resins have long served to meet the performance requirements of a wide range of pressure vessel products. However, these resin systems have well known drawbacks which may include their limited temperature capabilities, unsatisfactory finished product aesthetics, lack of extended durability, lack of appropriateness for recycling and manufacturing related issues such as down time due to clean-up and material handling costs.

Thermoplastic resins are becoming increasingly popular as matrix material in a composite because of better control over the reinforcement/matrix ratio, scrap materials which can be effectively recycled, diminished regulation issues caused by emissions, higher processing speeds for filament winding, and faster changeover, startup and clean up times.

Problems are associated with filament winding commingled thermoplastic and reinforcing materials on a thermoplastic liner to produce a filament wound, thermoplastic pressure vessel. One such problem is associated with the heating operation following the winding procedure. During that operation the wound liner is placed in a fixture and rotated about its longitudinal axis. Heat is applied at a temperature between the melting point range of the wound thermoplastic matrix and the melting point of the liner to fuse the matrix and soften the liner. During the heating operation the liner tends to soften and become distorted.

In some applications that do not require a thermoplastic liner an inflatable rubberized core is coated with a release agent and is filament wound with commingled thermoplastic and reinforcing materials. After the winding and heating operations the core is deflated and removed from the wound pressure vessel.

The inflatable rubberized core is typically made from neoprene or silicone and the heating process may lead to deterioration of the core. The core may become brittle, less resilient, and deformed. When the core is removed from the tank and reused, it exhibits a reduced life cycle and is more prone to failure during use, thus increasing the risk of a faulty finished article.

SUMMARY OF THE INVENTION

This invention provides a technique for pressurizing and cooling the interior of a filament wound pressure vessel during a heating process. If a thermoplastic liner is employed, the liner is mounted between the head stock and tail stock of a filament winding machine. The liner has a cylindrical sidewall, convex end walls and an access opening in at least one of the walls. Typically the opening is in one of the end walls.

A reinforcing filament is commingled in a thermoplastic matrix. The thermoplastic matrix may be continuous filaments of polypropylene, polyethylene, polybutylene terephthalate, polyethylene terephthalate, or nylon, among others. The reinforcing filament may also be glass, carbon, Kevlar, metal or some other reinforcing material or combination thereof.

The liner is rotated about its longitudinal axis and the filament is helically wound about the walls of the liner in a known manner. After removal from the winding machine, the liner is partially filled with water and the wound liner is mounted for axial rotation in a curing oven. The open end of the liner is closed with a preset pressure relief valve and heat is applied to fuse the thermoplastic matrix During the heating operation steam is created to pressurize the liner to the preset pressure of the pressure valve while the unvaporized water in the liner cools the liner. Pressurization of the liner not only maintains the firmness and dimensional stability of the liner during the winding operation but also prestresses the reinforcing filaments so that the filaments will be optimally loaded during service.

DETAILED DESCRIPTION OF THE INVENTION

Figure 1:
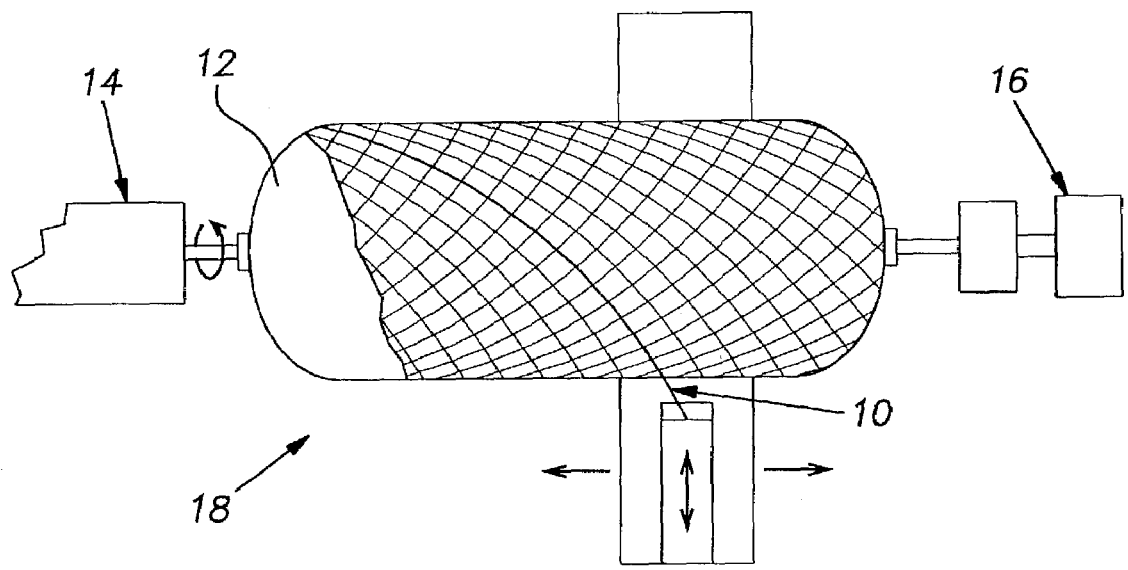
FIG. 1 is a semischematic view of a filament winding machine.
Figure 2:
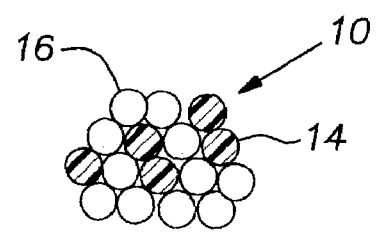
FIG. 2 is an-enlarged cross sectional schematic view of a commingled tow or roving employed to wind a liner.
Figure 3:
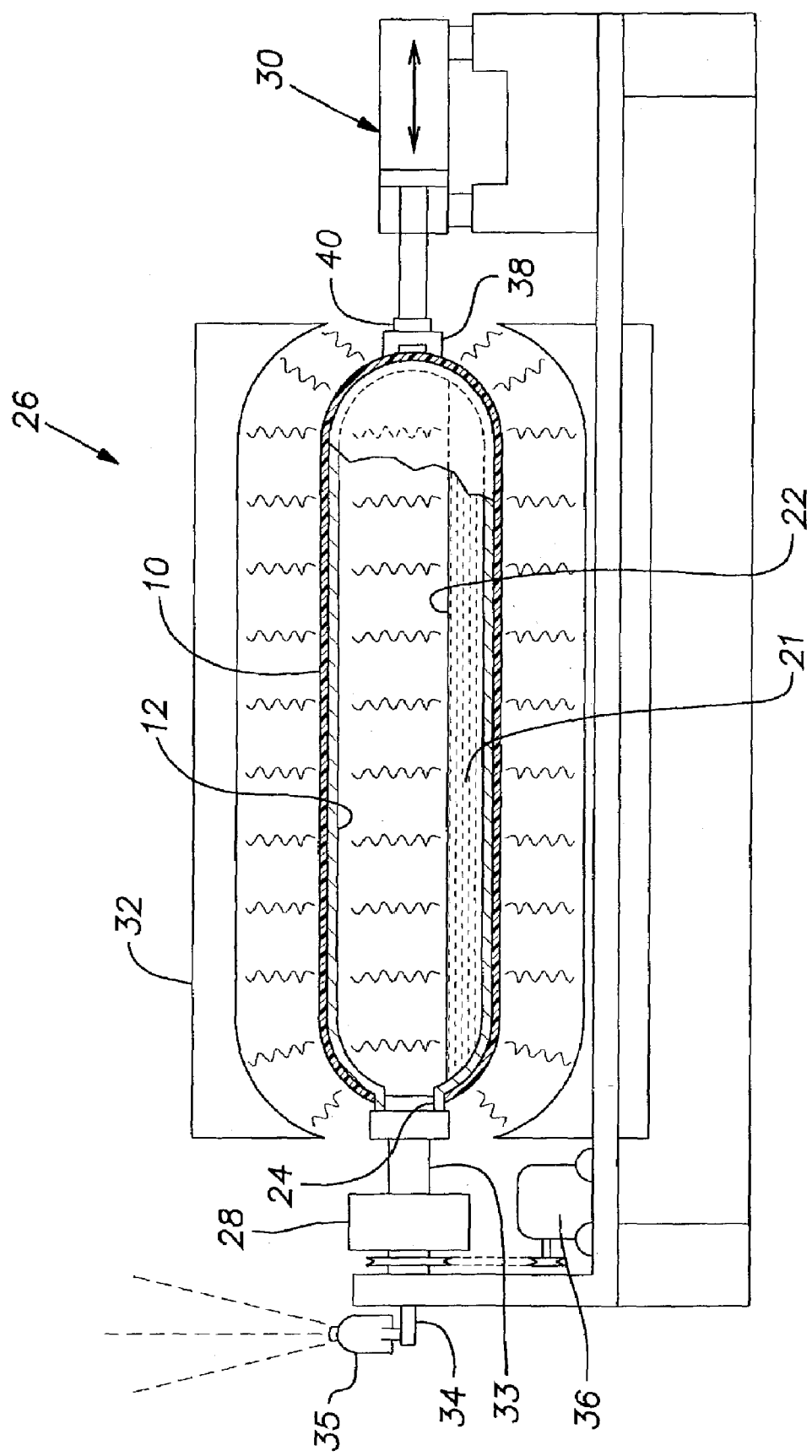
FIG. 3 is a cross sectional view of a wound liner within a heating oven.

A reinforced thermoplastic pressure vessel is manufactured by filament winding a commingled tow or roving 10 onto the surface of a thermoplastic liner 12. The roving 10 comprises commingled strands of thermoplastic resin material 14 an reinforcing fibers 16. The thermoplastic resin material may be polypropylene, polyethylene, polybutylene terephthalate, polyethylene terephthalate or nylon. The reinforcing fibers may be glass, carbon, Kevlar, metal and equivalent materials.

The thermoplastic liner 12 may be produced by blow molding, injection molding, rotational casting or other molding techniques. The liner may be made from any suitable thermoplastic having a melting or softening point higher than that of the thermoplastic fiber to be wound thereon.

The liner 12 is mounted between the head stock 14 and tail stock 16 of a filament winding machine 18 and is rotated about its longitudinal axis. The roving 10 is wound in a preselected pattern about the liner 12. The pattern may be helical, as illustrated, or may be polar, or other known patterns.

After the winding operation the wound liner is removed from the winding machine and is partially filled with a cooling medium 21, such as water, so that the level 22 is below an access neck opening 24 when the liner is in a horizontal position. The wound liner is then mounted in a heating oven 26.

The oven 26 includes a head stock air chuck 28, a movable tail stock 30, and a heat source 32 which substantially surrounds the wound liner. The wound liner is mounted within the oven 26 between the air chuck 28 and the movable tail stock 30. The air chuck 28 includes a ram 33 which engages and seals the neck opening 24. A hollow tube 34 extends through the ram 33 and a sliding seal (not shown) is provided between the ram 33 and the tube 34. The tube 34 communicates with a relief valve 35 which is preset to a pressure of between about 5 to 25 psi. A motor 36 is provided to rotate the ram 32 and, therefore, the wound liner about their longitudinal axis. The tail stock 30 securely holds the wound liner against the ram 33 and a pressure,pad 38 mounted on a bearing 40 permits rotation of the wound liner relative to the tail stock 30.

The heat source 32 is preferably infrared radiant heat, either electric or gas fired and heats the wound liner while it is slowly rotated by the motor 36. The temperature is maintained at a value which is sufficient to fuse the thermoplastic resin material 14 but which is insufficient to significantly soften the thermoplastic liner 12.

While the heat is applied the wound liner is rotated and the coolant 21 is caused to engage the inner surface of the liner to cool the liner steam pressure builds to the pressure of the preset relief valve 35 and the pressure maintains the dimensional stability of the liner during heating. The steam pressure also prestresses the reinforcing fibers 16 so that they will be properly loaded during actual use. The wound liner is then cooled and removed from the oven.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. A method of making a filament wound composite pressure vessel comprising the steps of providing a thermoplastic liner having a cylindrical sidewall, convex end walls and at least one access opening in at least one of said walls, providing a reinforcing filament commingled in a thermoplastic matrix, said thermoplastic matrix having a melting point lower than a melting point of said liner, helically winding said filament and matrix about said walls to provide a wound liner, partially filling said liner with a liquid through an access opening to a level below said access opening, closing said access opening and providing a pressure relief valve at said access opening, said valve being adaptable to vent and maintain the interior of the liner at a set constant predetermined pressure, rotating and heating said wound liner to a temperature sufficient to vaporize a portion of said liquid to pressurize said liner at said set constant predetermined pressure and sufficient to fuse the thermoplastic matrix but insufficient to significantly soften said thermoplastic liner.

2. A method according to claim 1 wherein an access opening is provided in one of said end walls.

3. A method according to claim 1 wherein said thermoplastic matrix is in the form of thermoplastic filaments.

4. A method according to claim 1 wherein said liquid is water.

5. A method according to claim 1 wherein said pressure is between about 5and 25psi.

* * * * *